United States Patent [19]
Altman

[11] Patent Number: 5,805,765
[45] Date of Patent: Sep. 8, 1998

[54] WALL-MOUNTED STEAM GENERATING APPARATUS AND A STEAM HEAD

[76] Inventor: Mitchell Altman, 5276 Orrville Ave., Woodland Hills, Calif. 91367

[21] Appl. No.: 738,576

[22] Filed: Oct. 28, 1996

Related U.S. Application Data

[62] Division of Ser. No. 286,936, Aug. 8, 1994, Pat. No. 5,616,265.

[51] Int. Cl.[6] ............................... F22B 1/30; F22B 1/20; A61H 33/06
[52] U.S. Cl. .............................. 392/324; 392/386; 4/524
[58] Field of Search ................................... 392/324, 325, 392/386, 392, 400, 401–402; 4/524, 597, 605; 359/507, 509, 512, 513, 514; 219/219

[56] References Cited

U.S. PATENT DOCUMENTS

| | | | |
|---|---|---|---|
| 3,557,389 | 1/1971 | Scobey | 4/524 |
| 3,708,218 | 1/1973 | Smillie, III | 359/512 |
| 4,076,374 | 2/1978 | Schwab | 359/509 |
| 4,150,869 | 4/1979 | Hansen | 359/512 |
| 4,546,236 | 10/1985 | Janson | 392/386 |
| 4,556,298 | 12/1985 | Gottlieb | 359/512 |
| 4,557,003 | 12/1985 | Jones | 4/605 |
| 4,681,255 | 7/1987 | Drost | 4/524 |
| 4,836,668 | 6/1989 | Christianson | 359/512 |
| 4,904,072 | 2/1990 | Christianson | 359/512 |
| 4,993,821 | 2/1991 | Christianson | 359/512 |
| 5,032,015 | 7/1991 | Christianson | 359/512 |

*Primary Examiner*—Geoffrey S. Evans
*Assistant Examiner*—Sam Paik
*Attorney, Agent, or Firm*—Ashen & Lippman

[57] ABSTRACT

Steam generating apparatus in the form of a thin, compact generally self-contained wall-mountable fixture. The fixture includes an upright front face section of porcelain or the like for being mounted in the wall of a shower or other enclosed steam room. The fixture further includes a frame that is fixed to the rear of the face section and supports a closed steam tank or boiler. A steam line delivers live steam from the boiler into the steam room. An steam head delivers the steam safely and with minimum noise. The fixture may also include a mirror and be mounted so that the mirror is face height of a standing user. The mirror is positioned adjacent to the boiler so that heat radiated from the boiler warms the mirror and inhibits it becoming fogged over by the steam in the room. The fixture also includes an electrical control system that is operable by the user from inside the steam room. The control system automatically maintains the user-preselected steam room temperature by regulating the power to the boiler so that steam is generated without interruption and after equilibrium is reached there are no noticeable changes in the room temperature.

25 Claims, 9 Drawing Sheets

WALL-MOUNTED STEAM GENERATING APPARATUS AND A STEAM HEAD

PRIOR APPLICATIONS

This application is a divisional application to parent application Ser. No. 08/286,936, filed Aug. 8, 1994, which is now U.S. Pat. No. 5,616,265, in the name of the same applicant and inventor.

FIELD OF INVENTION

Steam generating apparatus for providing live steam to a shower or other enclosed area to create a steam room.

BACKGROUND OF THE INVENTION

Heretofore steam generating apparatus had taken the form of relatively large floor-supported units that were housed at a location remote from the shower or other steam room, such as in a closet, an attic or a basement. The unit provided, through an elongated steam line or hose, a supply of live steam into the room. The line could be quite long, such as 50 feet, which would result in substantial heat loss. The user might have to control the unit from the unit itself at the remote location. Further, the unit would take up space and could not be put too close to certain structure or objects because of the high temperature of the boiler of the unit.

The control of such unit was generally very basic, in that the user-set temperature was generally maintained, but it was based on monitoring and then turning the steam generator on and off in reaction to changes in the room temperature, which resulted in noticeable cyclical fluctuations in temperature above and below that set temperature. Also the sound of the heat generation going on and off were noticeable and made the temperature variations more noticeable. This lack of a constant temperature and sound level detracted from the tranquility and enjoyment of the steam room.

Another problem encountered by use of such units was fogging over of mirrors in the shower or steam room. Various defogging mirrors have been used, but they were costly, complex or both. One prior art attempt to solve the problem is illustrated in U.S. Pat. No. 4,150,869 which discloses a special apparatus that caused heated water or steam to flow continuously over the rear of a shower mirror to warm it. A similar approach is disclosed in U.S. Pat. Nos. 4,993,821, 4,836,668, 4,557,003, 4,904,072 and 5,032,015. U.S. Pat. No. 4,076,374 discloses a device which uses a continuous flow of heated water over the front face of the mirror. Such an arrangements are also subject to clogging and other maintenance problems associated with flow devices. U.S. Pat. Nos. 3,708,218 and 4,556,298 disclose devices that run heated water through special coils located behind the mirrors.

SUMMARY OF THE DISCLOSURE

A steam generating apparatus or unit for providing steam into a shower or other enclosed steam room 22. The illustrated unit is in the form of a thin compact self-contained fixture 20. The fixture 20 has a mirror 24 and is adapted to be a wall-mounted to position the mirror at face height of a standing user. The fixture 20 is narrow enough to fit between a standard-spaced pair of vertical wall studs 26. The illustrated fixture 20 is also very thin, having a front-to-back dimension of less than about four inches, which allows it to be contained within a normal wall of a steam room.

The illustrated fixture 20 has a porcelain front face section 28 that may be sealed to a steam room support wall 23. The unit 20 has an electrical control system 30 which is user-operated from a control panel 31 on the front face section 28.

The illustrated unit 20 includes a frame or housing 32 fixed to the rear of the face section 28 for being generally disposed within the wall 23. The frame 32 supports a steam generating boiler 34 that has a steam line 36 leading to a steam head 38 in a wall of the steam room. Preferably the steam head 38 is located close to the fixture, as in the same support wall 23, to minimize the length of the steam line 36 and reduce heat loss.

The boiler 34 is located adjacent to the exposed rear of the mirror 24 so that heat radiated from the boiler warms the mirror and inhibits steaming over of the mirror. A small gap separates the mirror from the boiler to prevent overheating of the mirror.

The illustrated steam head 38 has a novel and improved design. It may be made of porcelain or the like to limit its heat absorption and thus its heated temperature. The steam flow is reversed in the steam head 38 so that it is directed rearwardly away from the interior of the room and back against a steam guard surface 40 aligned with the wall that supports the steam head. Thus, there is no direct flow of the live steam outwardly into the room. This arrangement also reduces the noise level of the entering steam. Further, directing the steam against steam guard protects the adjacent areas of the supporting wall.

The illustrated electrical control system 30 greatly improves the temperature maintenance ability of the fixture 20 by determining and then maintaining an effectively generally steady level of power input to the boiler 34. As a result, instead of the temperature cyclically varying as much as 1½°–2° Fahrenheit, which is readily noticeable by the users (especially when accompanied by intermittent steam generation), the variation is reduced to a non-noticeable span of about ½° Fahrenheit. Further, during a steam session, the effective power level provided to the heating coils of the steam boiler maintains the heat level of the coils so as to maintain generally continuous steam generation. This also avoids disturbing sounds caused by the coils cooling substantially and then reheating.

DETAILED DESCRIPTION OF THE DRAWINGS

PRIOR ART

Figure 1:
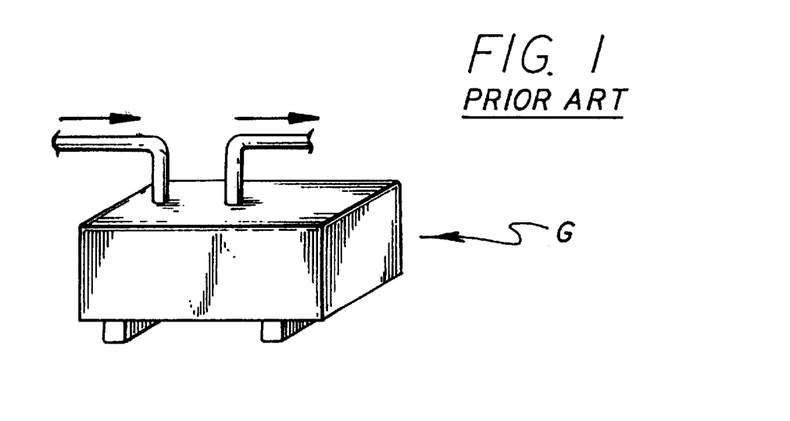
FIG. 1 is a schematic perspective view of a prior art steam bath generator.

FIG. 1 illustrates a common prior art form of steam bath generator "G." Such units were characteristically basic black box units designed to be floor mounted at some location remote to the shower or other steam room facility, such as in a closet, an attic, a basement or a vanity under a sink. The steam outlet line might be very long, e.g., 50 feet, to accommodate the remote location. A typical unit is 8 inches wide by 20 inches long by 15 inches high. Typically, the unit would include a simple timer that also acted as the on/off switch and possibly a temperature and/or time control.

PRESENTLY PREFERRED FORM OF THE INVENTION

Figure 2:
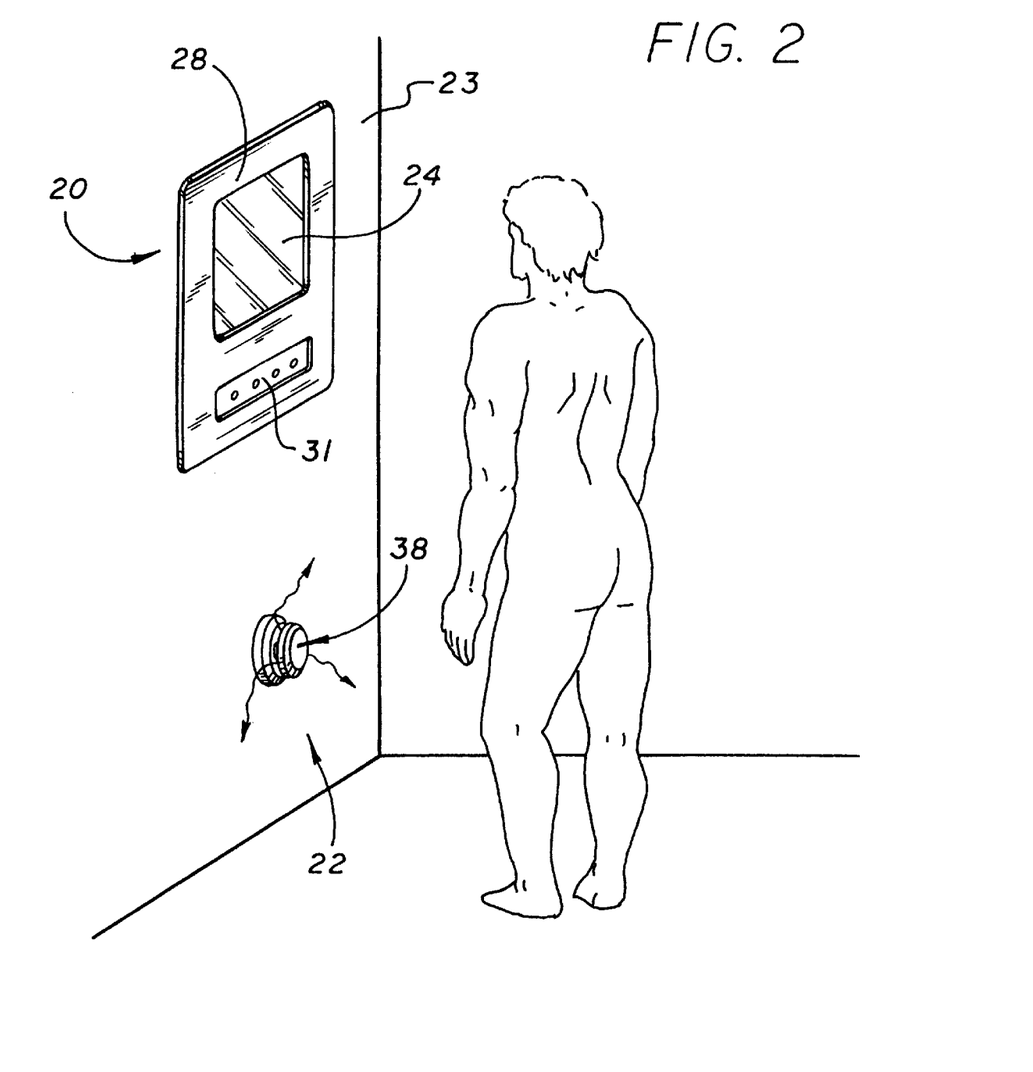
FIG. 2 is a schematic perspective view of a steam room with a steam generating fixture installed therein, the fixture embodying a presently preferred form of the invention.

FIG. 2 illustrates schematically an enclosed steam room 22 and portions of the steam generating fixture 20 mounted in a support wall 23 of the room, the fixture 20 comprising a presently preferred form of the present invention.

Figure 3:
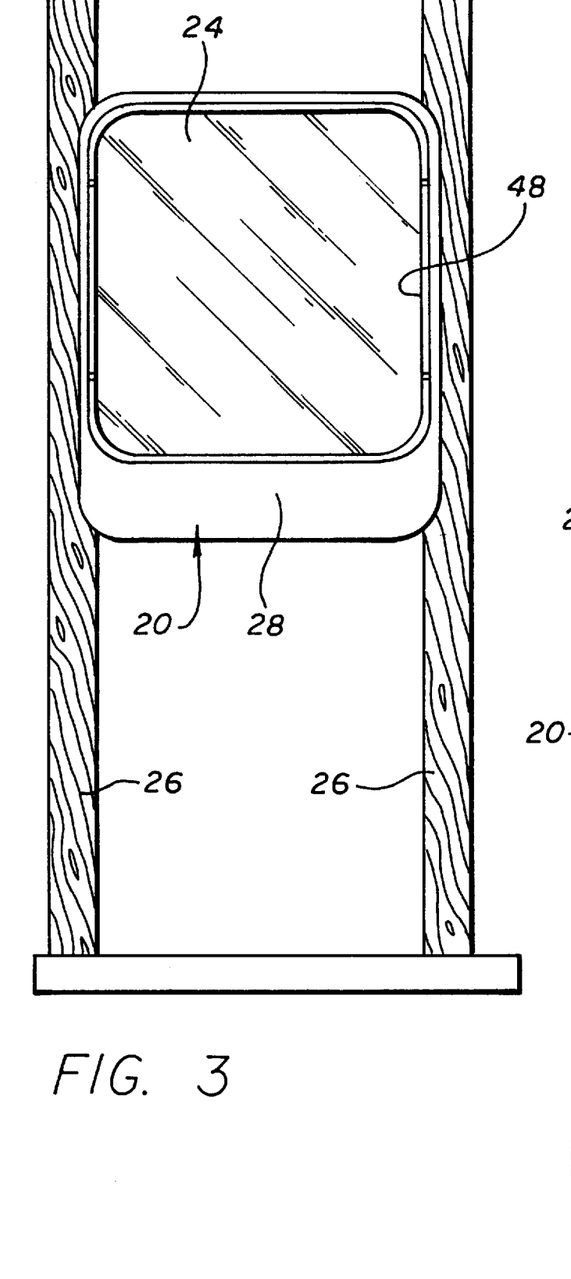
FIG. 3 is a schematic front elevational view showing the fixture of FIG. 2 mounted on a wall between vertical studs.
Figure 4:
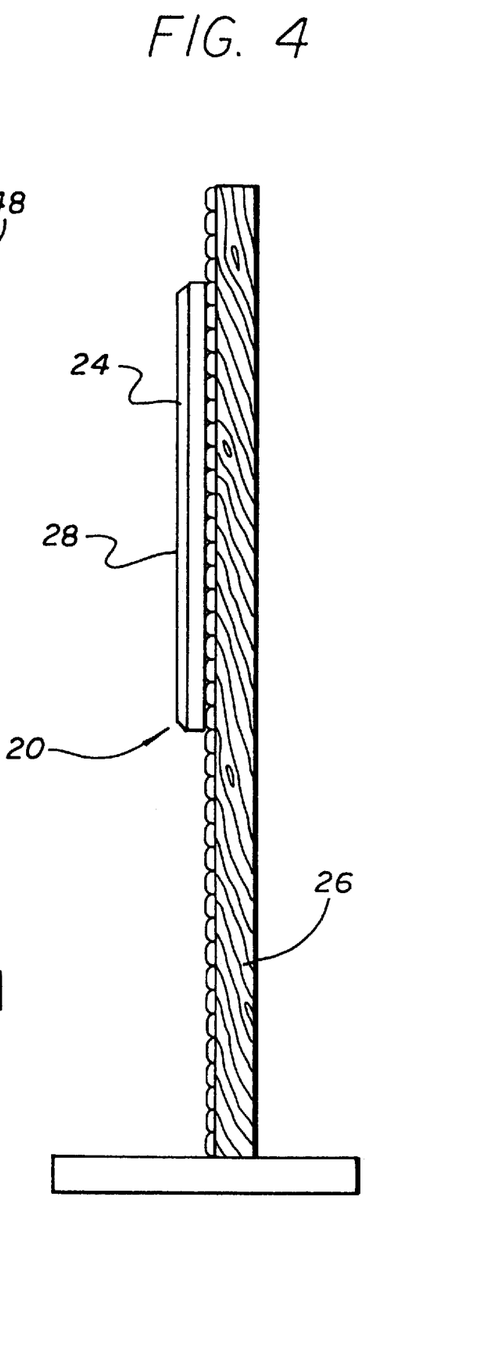
FIG. 4 is a schematic side elevational view of the wall studs and fixture of FIG. 3.

As noted above, and shown best in FIG. 4, the illustrated fixture 20 is quite thin, somewhat less than about four inches front-to-back. This allows it to fit within the usual supporting wall. The frame 32 of the illustrated fixture 20 has a width of about 14 inches, which allows it to be mounted (by suitable support means such as nails or screws not shown) in the approximately 14.5 inch space between a pair of standard-spaced upright vertical studs 26 in the supporting wall 23 of the steam room 22. FIG. 3 shows the tile covered wall 23 cut away to reveal the location of the studs 26. The illustrated fixture 20 includes the generally rectangular front face section 28 which supports the mirror 24 and the user-operable control panel 31. The fixture 20 is mounted at a height placing the mirror 24 at the height of the head of a user standing in the steam room.

Figure 5:
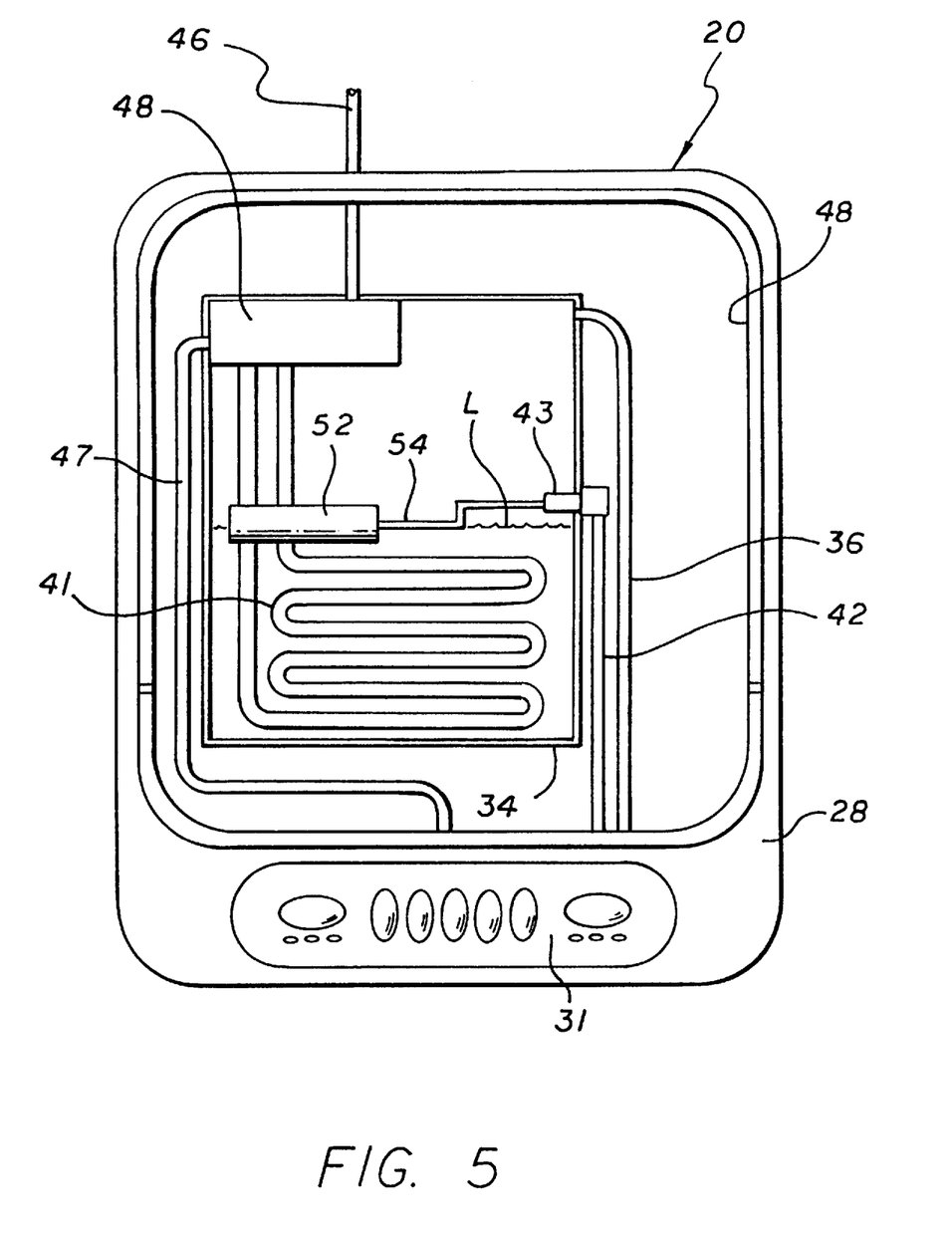
FIG. 5 is a schematic front elevational view of the fixture, with portions broken away to show details of construction.
Figure 5A:
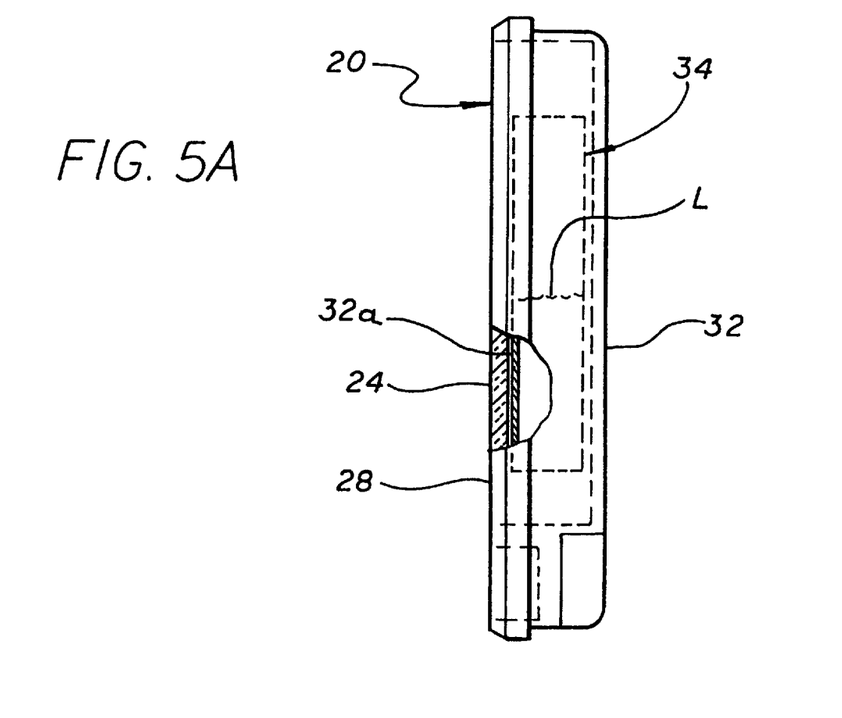
FIG. 5A is a schematic side elevational view of the fixture.

As shown best in FIG. 5A, the front face section 28 supports the frame or housing 32 that is generally a rectangular box made of metal or the like. Within that housing 32 the thin steam tank or boiler 34 is mounted. As shown in FIG. 5D, the tank 34 contains electrical resistance heating elements or coils 41 that are energized to heat water in the tank to produce steam. The steam tank 34 is connected intermediate its height to an incoming water line 42 that is connected to the facility water supply. Flow control means 43 automatically maintain the desired water level in the tank 34. The tank 34 is also connected adjacent its top to the outgoing steam outlet line 36 that leads to the steam head 38. The steam head 38 may be mounted at a desired location in a wall of the steam room. Preferably the steam head 38 is located as close as feasible to the fixture 20. The fixture 20 is connected by a high power line 46 to the electrical power supply of the facility that provides the electrical energy for the heating coils 41 and the control system 30.

More particularly, the front face section 28 is a generally flat rectangular plate that is rounded off at its corners. It may be made from porcelain or like material that is suitable for a shower or steam room. Other materials such as natural marble or granite or man-made synthetic materials such as high temperature resistant plastic may also be used. Such materials do not readily absorb heat and therefore do not attain high temperatures as would metals. Such materials are therefore preferred for safety reasons. When face section 28 is mounted on the steam room wall 23, it is generally aligned with the wall. The face section 28 maybe sealed around its edges to the adjacent surface of the wall 23 as with a silicone seal that can withstand high temperatures. This prevents moisture from leaving the steam room and adversely affecting the structural integrity of the wall or areas beyond the wall.

A large generally rectangular centered opening 48 is provided in the face section 28 for receiving the forwardly facing mirror 24. The illustrated mirror 24 is generally rectangular, being rounded at its corners. The opening 48 is generally the same shape, and the mirror 24 is sealed to the face section 28 as by means of a double-sided adhesive gasket that is resistant to high temperatures. Alternatively, the mirror and opening might be oblong or some other suitable shape.

The generally rectangular housing or frame 32 is fixed to the rear of the face section 28 by any suitable means such as screws (not shown). The frame 32 may be of any suitable rigid material such as steel or metal alloy.

The generally rectangular steam tank or boiler 34 is mounted in the housing 32 immediately behind the mirror 24. As noted above, the tank 34 and the housing 32 are both quite thin so they normally fit within the confines of a standard wall. The heating coils 41 are located at the bottom of the tank 34 and are connected through the electrical control system 30, to the source of electrical power. As shown by the cut-away section of FIG. 5A, the rear of the mirror 24 is exposed to the adjacent wall 34a of the steam tank 34 so that the heat from the tank will radiate outwardly against the rear of the mirror and thereby heat the mirror to inhibit fogging of the front of the mirror. In the illustrated fixture 20, the rear of the mirror 24 is spaced about 1/8 inch to about 1/16 inch from the adjacent face 34a of the tank. This creates an in space that prevents the mirror from becoming too hot and dangerous to touch.

In the illustrated fixture 20, the water level "L" in the tank 34 is maintained about half way to the top as shown in FIG. 5. The illustrated tank 34 uses about three quarts of water.

As shown generally in FIG. 5, the mechanical water flow control means or mechanism 43 that controls the flow of fresh water into the tank 34 from the water inlet line 42, is located at the inlet 50 from the inlet line 42 at about midway up the height of the tank. The flow control means 43 includes a mechanical valve mechanism 53 that is located in the inlet 50 and is operable to open and close that inlet. The flow control means 43 also includes a cylindrical floater 52 that rides at the surface of the water in the tank 34 and is connected through an offset crank arm 54 to the valve mechanism 53. Vertical movement of the floater 52, caused by changes in the tank water level "L," operates the valve mechanism 53 at the inlet 50 to regulate the inflow of fresh water into the tank 34. Each time the level of water in the tank 34 goes slightly below a predetermined level, the floater 52 thereby drops sufficiently to actuate the valve mechanism 53 to allow additional incoming water to flow into the tank to maintain the desired level. This control is quite sensitive, reacting to a change in the water level of about one-sixteenth of an inch. Thus, there is a generally steady, constant, limited tear drop or trickle flow of water into the tank. The sound of this flow is not noticeable to the users.

Figure 5B:
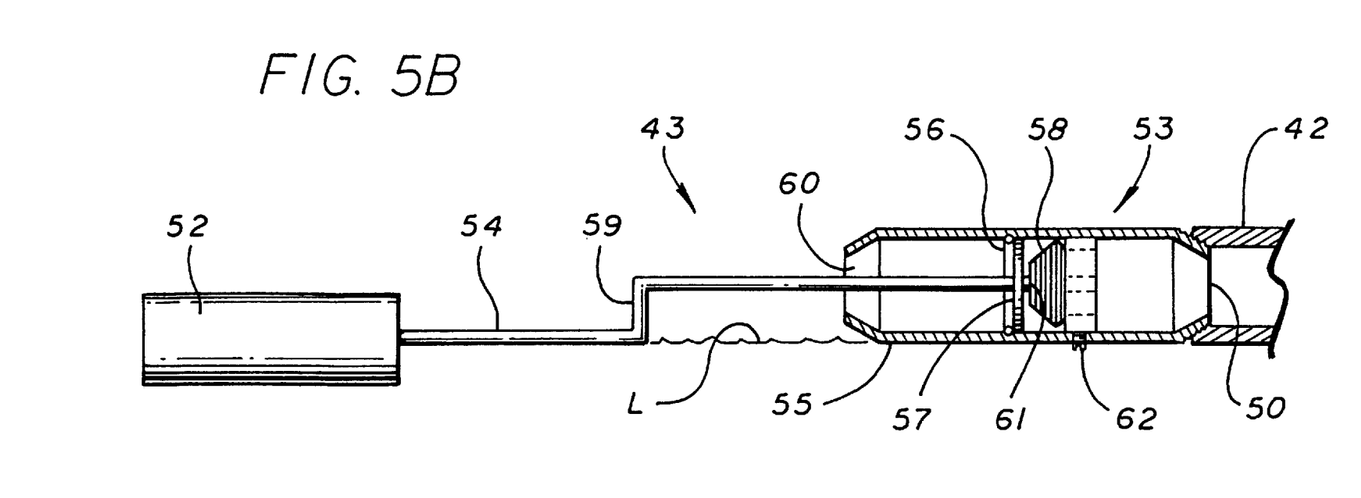
FIGS. 5B and 5C are schematic side elevational views of the flow control means of the fixture.
Figure 5C:
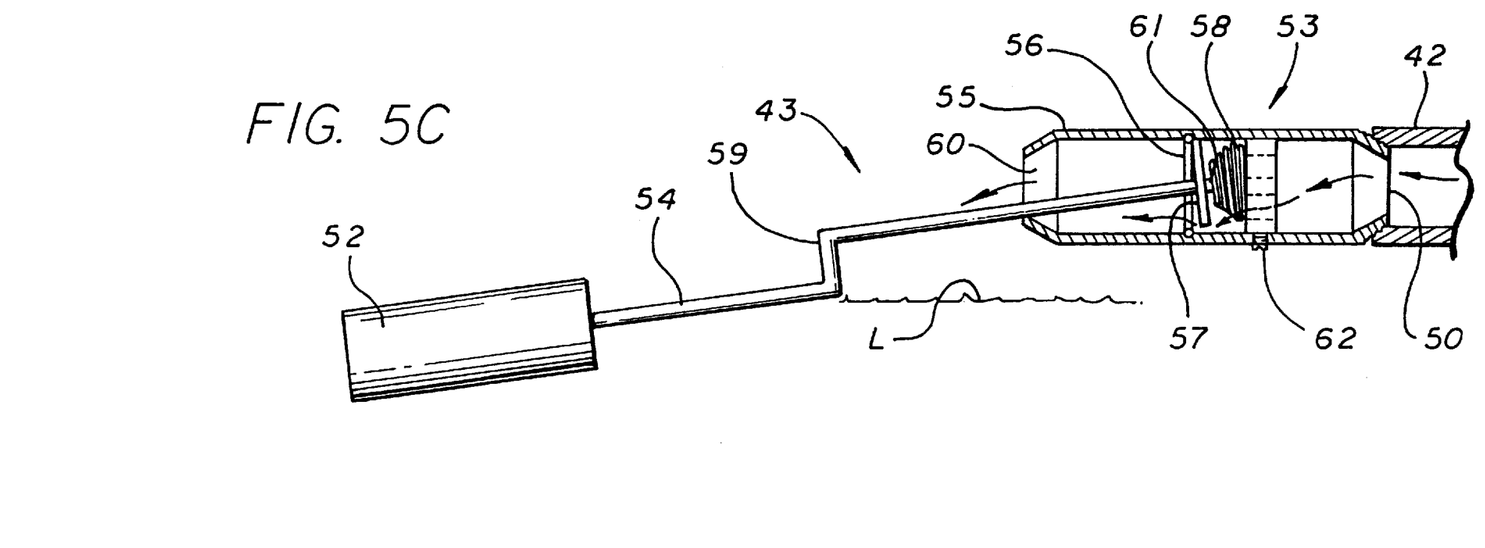
Figure 5D:
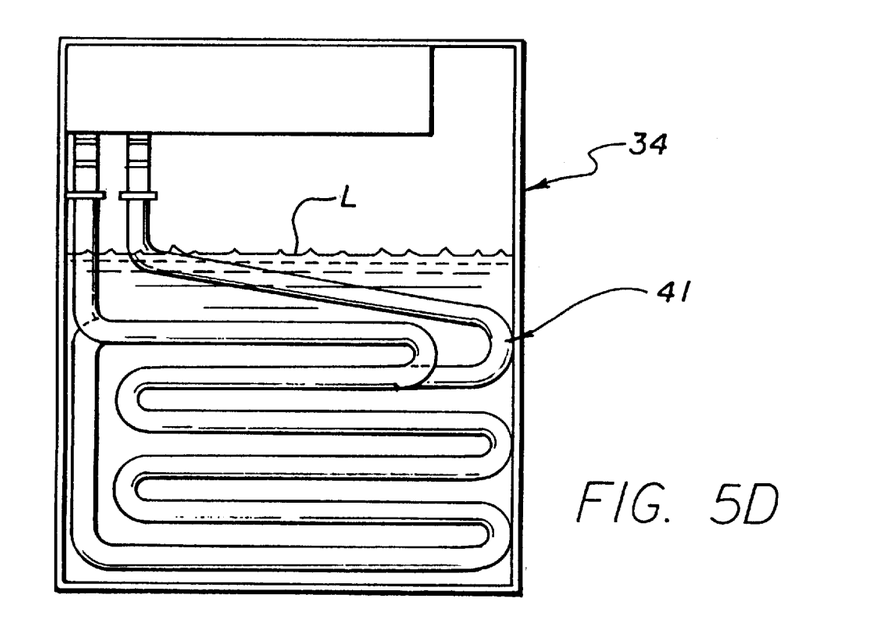
FIG. 5D is a schematic front elevational view of the fixture showing the heating coils.

More particularly, as shown in FIGS. 5B and 5C, the valve mechanism 53 has a tubular housing 55 which is connected to the inlet 50 of the inlet water line 42. An O-ring 56 is supported within the housing 55. A generally disc-shaped valve 57 is located in the housing 55 upstream of the O-ring 56. As shown in FIG. 5B, when the water level L is at the desired level, the valve 57 is upright and urged against the O-ring 56 to close the valve mechanism 53 and block the flow of water past the O-ring 56. In this connection, the disc valve 57 is fixed on the end of the arm 54 and urged into sealing engagement with the O-ring 56 by a compression spring 58 and line water pressure. The end of the arm 54 opposite the floater 52 is connected at 61 to the spring 58 to allow pivoting of the arm about this connection 61.

FIG. 5C illustrates what happens when the water level L in the tank 34 drops. When the weight of the floater 52 overcomes the forces of the water line pressure and of the spring 58, the floater 52 moves downwardly and the arm 54 tilts, pivoting at the connection 61 with the spring 58. This tilts the valve 57 to separate the lower portion of the valve from the O-ring 56 to allow flow of water past the O-ring and through the exit 60 into the tank 34. When the level L reaches the desired level in FIG. 5B, the valve 57 again seats against the O-ring 56 to block further flow. An adjusting screw 62 may be provided to adjust the force exerted by the spring 58 to afford the desired valve opening in response to the water level dropping.

The electrical control system 30 regulates the power to the heating coils 41. The coils 41 heat the water in the tank 34 above the boiling point and cause steam to be generated in the upper portion of the tank. This steam then flows through the steam outlet line 36 to the steam head 38 and into the steam room 22.

The steam head 38 is desirably located as near as feasible to the fixture 20 as this reduces the length of the steam outlet line and resultant heat loss. It is preferred that the length of the outlet line 36 be less than about 10 feet, but in any event on over about 15 feet.

Figure 6:
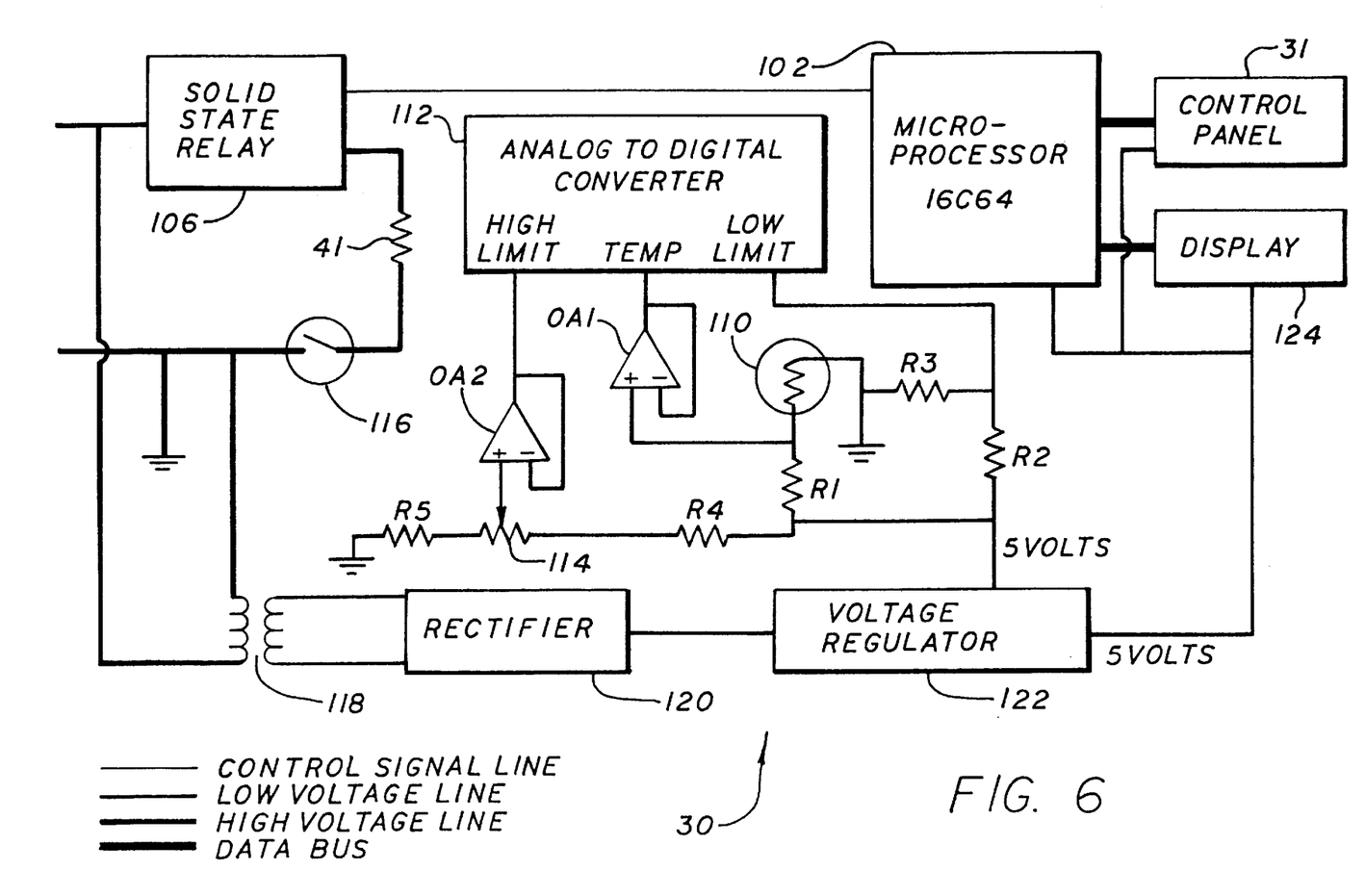
FIG. 6 is a schematic diagram of the electrical control system of the fixture.

FIGS. 6 illustrates schematically the electrical control means 30 of the illustrated steam generating fixture 20. In general, after initial start up and an equilibrium situation has been achieved, for the duration of the steam bath session the power delivered to the heating element 41 is maintained at an effectively generally constant level which the control means has determined will produce the correct amount of heat to keep the steam bath at the user selected temperature. A generally continuous flow of steam into the steam room is also maintained.

In this respect, the illustrated fixture 20 provides a significant improvement over prior art systems. In such prior art systems, the unit would operate intermittently, being on full blast, then off for maybe 10 to 15 seconds, and the on again full blast. The cycle would repeat until the end of the steam bath session. For example, if the user set the desired temperature at 100°, Fahrenheit, the old system would provide steam at maximum output or full "on." When a temperature of approximately 100° was reached, the power would be cut off but the steam unit would continue to produce steam potentially raising the temperature to possibly 102°.

Figure 7:
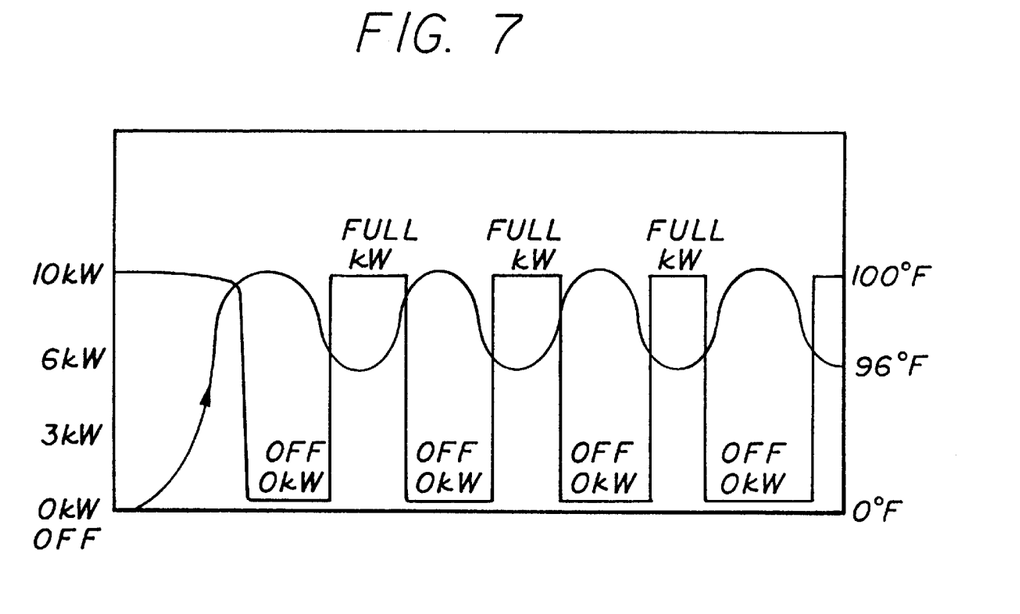
FIG. 7 is a graph showing heat vs. power levels for prior art systems.

The temperature of the steam bath would then begin decreasing due to various heat losses, which would be noticeable to the users, particularly because they could see and hear that the unit was no longer generating steam. Assuming that the set point to resume heating was 99°, as the temperature reached that level, full power would again be applied to the steam unit. After a brief delay, during which the temperature continued to fall, the steam production would begin and the temperature would rise again. This temperature fluctuation, accompanied by the intermittent operation of the unit would be very noticeable to the user and would detract from the desired, calmed, relaxed atmosphere of a steam bath. This fluctuation is illustrated in FIG. 7.

In the illustrated fixture 20, the control means 30 provides effectively continuous, at least partial power to the heating coils throughout the steam session, and thus, generates a flow of steam that is generally uninterrupted and non-disturbing to the users. As noted above, after start up, the control means 30 maintains an effective averaged level of power delivered to the heating element 41 to keep it at a generally constant temperature as is necessary to maintain the user indicated temperature level in the steam room. Although small variations in the power level may be necessary to maintain that desired temperature, the user would not be aware of such variations, and is spared the large and noticeable temperature swings, and accompanying changes in sound level, of the prior art systems. Another advantage of always maintaining at least partial power to the heating coils throughout the steam session is the avoidance of popping sounds produced as the heating element or coil expands and contracts as it cools and reheats.

In general, at the control panel 31, the user first selects the temperature desired for the steam bath session. Then the control means 30 automatically determines, as described in detail below, the correct effective power level for the heating coils to maintain the user preset steam room temperature. This may involve some trial and error, initially trying an effective power level and then adjusting that level as necessary. Several adjustments may be required. Finally the control means essentially maintain that determined effective power level to the heating coils 41 throughout the steam bath session. If the steam room temperature does change, as if a door is left open, the control means 30 will automatically make an adjustment in the power level. The fixture 20 never stops producing steam and no changes in temperature or sound are experienced or noticed by the users.

The control means 30 thus takes into account a variety of factors which influence the temperature in the steam room such as the steam room materials, the level of insulation, the external environment, the amount of leaking in or out between the steam room and the environment, the number of users of the steam room, the size of the steam room, etc., etc. The control means accommodates all of these factors for a particular steam room and the device can be calibrated so that settings can represent temperature. FIG. 6 illustrates in detail the apparatus and circuitry for achieving this control of the heating coils 41 and the temperature in the steam room.

A microprocessor 102 controls the heat output of heating element 41 by controlling a solid state relay or triac 106. This relay 106 controls the voltage waveform across heating element 41 by blocking that portion of the a.c. waveform which is above a predetermined "maximum voltage" dictated by the microprocessor 102 in response to a setting at the control panel. The heat produced by the heating element 41 is inversely related to the proportion of the voltage waveform blocked.

A preselected desired "set point" temperature is manually chosen by the user at the control panel 31 and the setting is processed and stored by the microprocessor 102. The microprocessor 102 also receives a continuous flow of actual temperature readings from a thermistor 110 that represents current temperature in the steam room. As will be explained in detail below, the microprocessor 102 uses this flow of actual temperature readings relative to the set point temperature, to regulate the average power to the heating element 41 so as to stabilize and maintain the steam room temperature at the set point temperature.

The microprocessor 102 can calculate the rate of temperature change as a function of applied power. For example, if the maximum power to the heating element results in a temperature change of ¼°/minute, and the system generates steam for approximately 1 minute after power is cut off, then the microprocessor could reduce power when the difference between the actual and desired temperature is ½°.

The solid state relay or triac limits the portion of the a–c cycle during which power is applied to the heating element 41. Since that power can range from 0–100% of available power, an appropriate setting can maintain the difference between the desired temperature and the measured temperature at 0° or close to it. If the applied power is insufficient to maintain the temperature at the desired level, the average power can be incrementally increased or decreased until the temperature level is held constant.

The thermistor 110 used in the present embodiment has a resistance of 10KΩs at 72° F. which drops by approximately 100 Ωs for every degree increase in temperature. The circuitry which includes first, second and third resistors R1, R2, R3, R4 and R5; potentiometer 114; first and second operational amplifier OA1 and OA2; and analog to digital converter (A/D) 112 is all designed to translate this changing resistivity into an eight bit word which is periodically applied from the A/D converter 112 into the microprocessor 102.

To obtain a voltage representative of resistance, the thermistor 110 is placed in series with the first resistor R1 to form a voltage divider, one end of which is connected to a power supply, in this case a voltage regulator with 5.0V d.c. output. The voltage at the ungrounded end of the thermistor 110 is a function of the resistance of the thermistor 110 and the resistance of the first resistor R1. Therefore, this voltage varies with temperature, just as the resistive value of the thermistor 110 varies with temperature. This voltage is isolated by the first Operational Amplifier OA1 and sent to the A/D converter 112.

The range of temperatures represented by the 8 bit serial word output of the A/D converter 112 is determined by the inputs to the "lower limit" and "higher limit" inputs of the converter. The "upper limit" voltage is maintained at approximately 3.3 volts, representing a temperature of 66° from the voltage divider, composed of fourth and fifth resistors, R4 and R5, along with a potentiometer, 114. The potentiometer 114 is set at the factory so that a temperature of 66° sensed by the thermistor 110 registers as the highest value word from the A/D converter 112. Higher temperatures would not be encountered because of safety systems that would cause a system shutdown. The voltage produced by this circuitry is isolated by a second operational amplifier OA2.

The "lower limit" is maintained at 1.2 volts by the voltage divider of second resistor R2 and third resistor R3. These values are set so that a temperature of 130° F. will register as the lowest value word from the A/D converter 112.

Therefore, the serial word output by the A/D converter 112 is inversely related to the temperature sensed by thermistor 110 with its minimum value (all zeroes) representing a temperature of 130° F. and its maximum value representing a temperature of 66° F. In the present embodiment, the smallest change in temperature which can be reported is 0.25°, the value represented by the least significant bit of this word.

Method of Control

Figure 8A:
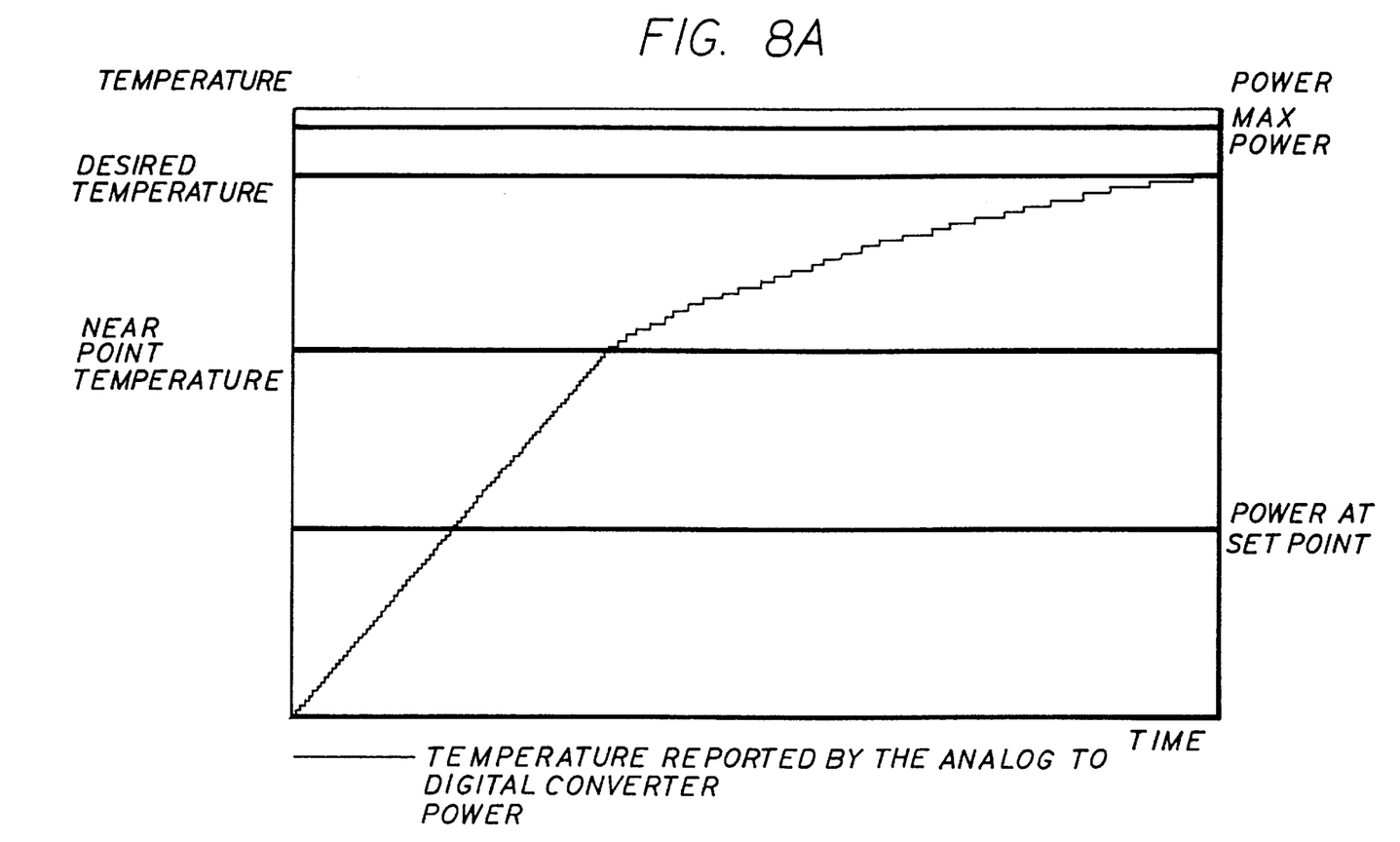
FIG. 8A is a graph showing reported temperature vs. power level during start-up of the fixture of FIGS. 2–6.

FIG. 8A is a graph of the steam bath temperature as reported by the analog-to-digital convertor (A/D) and power level to the heating element versus time during start up operation of the steam bath. At the beginning of a steam bath session full power is commanded so that the room will warm up as quickly as possible. Normally, steam is produced in from three to five minutes, after which the temperature increases. The rapid rise in temperature during the beginning time in FIG. 8A reflects this. In the preferred embodiment, the temperature measurements are quantized to ¼ degree by the A/D.

When a first predetermined temperature, near the desired temperature, ("near point temp") is registered by the A/D 112, the microprocessor 102 reduces the power delivered to the heating element 41. Each time an incremental increase in temperature is registered, the power is decreased by the following amount:

$$\Delta Pow = \frac{\text{Full Power} - \text{Set Point Power}}{\text{Set Point Temp} - \text{Near Point Temp}} * \Delta \text{Temp}$$

The "Set Point Power" is a predetermined power level chosen to stabilize the temperature at the set point temperature commanded by the user. This value may be experimentally determined at the factory. The incremental power decreases yielded by the above equation are designed to result in "Set Point Power" just as the temperature set point is reached, as shown in FIG. 8A. Once the "Set Point Power" is set accurately, the heat input from the steam should balance the heat loss from all sources. The temperature should then remain at the set point temperature indefinitely.

Until the system has been calibrated, there is a good chance that "Set Point Power" will not be set accurately. If for example there is no usage history available, for instance, "Set Point Power" may be just a "guess" which is set at the factory at "one half" power. The microprocessor can store a value of set point power, which may be changed if that value is insufficient to maintain temperature under different conditions. Once the system has been calibrated, the control panel settings will accurately reflect desired temperatures.

A preferred embodiment, the control panel 31, allows one or more users to record a certain set of steam bath settings into memory. As an example, a first user may prefer a steam bath that lasts for 25 minutes at a temperature of 105° F. These values may be stored in the microprocessor for later recall by the pressing of a button.

The "Set Point Power" can be changed by the control means during the steam bath so that accurate control of the power and temperature may be achieved. When the temperature is below the set point, for instance, the microprocessor 102 can compute the rate of change of temperature over a predetermined period of time. When the temperature difference between the desired temperature and actual temperature reaches a predetermined value, the power level is reduced, which reduces the rate of change of temperature. As the differential approaches zero, the power can be further reduced to a level at which equilibrium is reached. This value would be considered the "Set Point Power."

Without a history of temperature readings over time, the flexibility of a variably controllable heater element is largely wasted. This is because a single instantaneous reading of the temperature yields little information to guide the adjustment to the heating element that should be performed. For instance, if the temperature were slightly below the user defined "set temperature" and declining rapidly, it would be advisable to increase the power to the heating element. But if the temperature were at the exact same mark, but increasing rapidly, it would be advisable to decrease the power to the heating element so that the "set point" temperature would not be severely overshot. Without a history of temperature readings over time it is generally impossible to say in what way the power to the heating element should be adjusted.

Furthermore, because of the great variety of different environments in which the steam bath could be installed, it would be impossible to design ahead of time a scheme that would work for all of these environments if only a single temperature measurement were available at any particular time. For a very large, poorly insulated enclosure, the power to the heating element could be modified greatly with only a slow effect on the temperature in the steambath. Whereas, with a small, well insulated enclosure, any change in power might cause a very rapid response in the steam bath temperature. A history of temperature measurements over time would reflect the various environments. Without this information it would be impossible for the designer to anticipate any particular environment.

If, however, the temperature is rising so rapidly that it is likely to rise above the set point even after power has been reduced, then the "Set Point Power" variable is reduced.

The microprocessor 102 also controls the system when a user merely wishes to take a shower. In this mode, the boiler tank 34 behind the mirror is heated to maintain a temperature above the dew point, thereby keeping mirror fog free. To do this, the microprocessor 102 turns on the heating element 41 at full power for a predetermined time, one minute in a particular embodiment. The heating element 41 is then turned off for 10 seconds and, thereafter approximately one third full power is applied to the heating element 41, which should maintain the temperature of the mirror above the dew point.

As in any device, there is some danger that, due to a malfunction, the heating element 41 could be energized at a time the water tank is empty. A temperature sensitive safety switch 116 is included in the circuitry as a safeguard against that eventuality. The switch is positioned to detect excess heat above the boiling temperature of water. The switch 116 responds to excess heat by opening the circuit, removing all power from the heating element 41.

A transformer 118 combined with rectifier 120 and voltage regulator 122 receive high voltage (220v) power through line 46 and provide isolated and low voltage power that is delivered through low voltage line 47. This low voltage output of the voltage regulator 122 is used to run all of the solid state circuits of the steam bath. An LED display 124 is also provided next to the control panel 31, to report to the user, the elected steam bath temperature, and duration and to report measured temperature and elapsed time to the user during the steam bath.

All of the electrical components used for the steam bath control means are widely available in many different varieties. The suitable microprocessor 102 is available from Microchip, Inc. with the model designation 16C64. A suitable analog to Digital converter is supplied by National Semiconductor as Model No. ADC0831CCN.

Figure 8B:
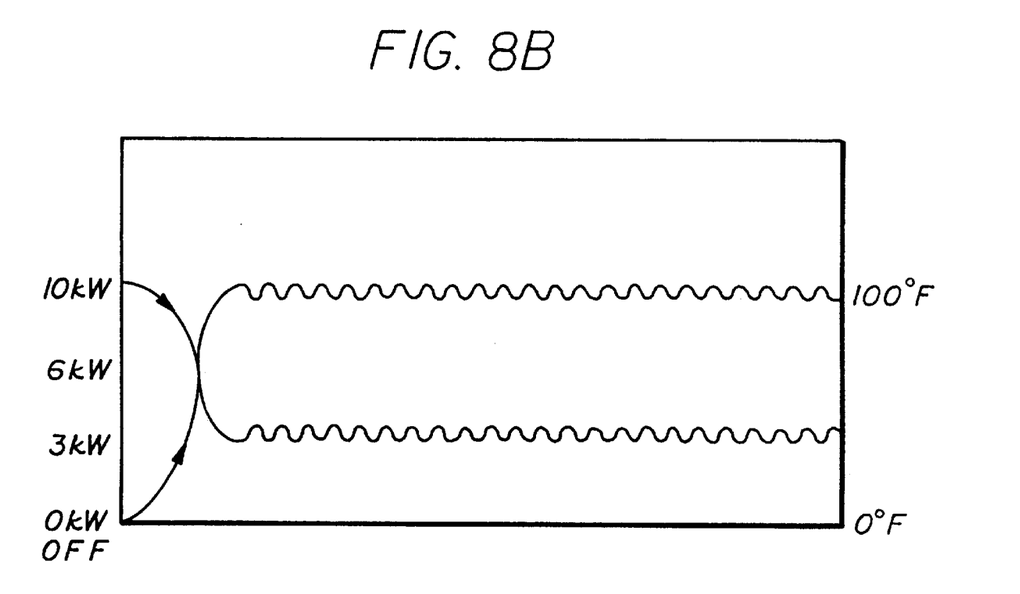
FIG. 8B is a graph like FIG. 7, but showing operation of the improved fixture of FIGS. 2–6.

FIGS. 7 and 8B show the improvement of the current system over previous steam bath control systems. FIG. 7 shows a temperature and power versus time graph for a previous system. Note the fairly large swings in temperature and power. FIG. 8B shows the same graph for the system as described herein. Note the far smaller swings in temperature.

Figure 9:
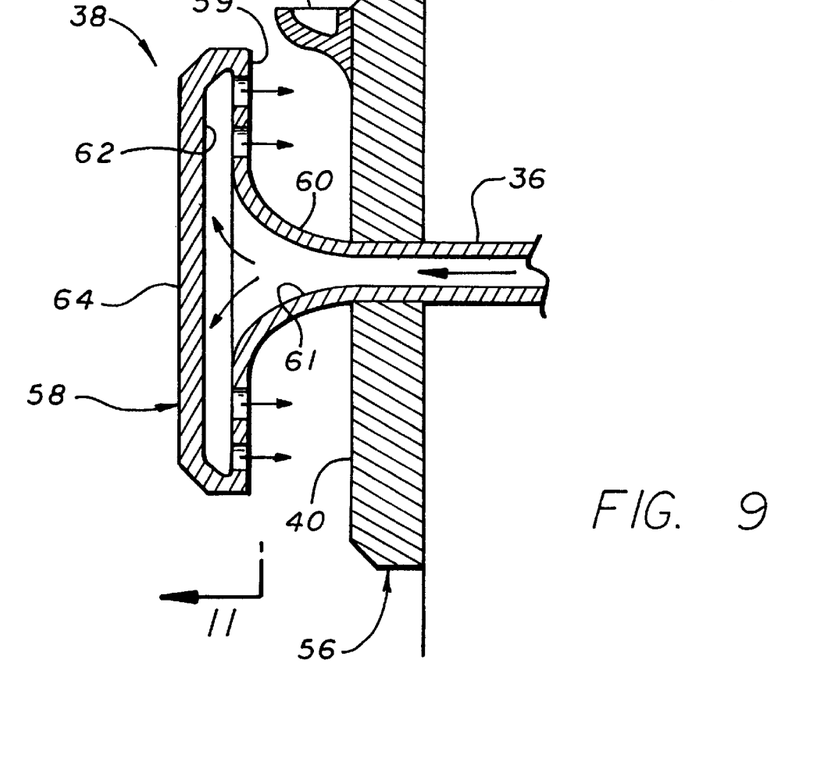
FIG. 9 is an enlarged schematic side section view of the steam head and the steam pipe of the fixture, and a portion of the supporting wall.
Figures 10, 11:
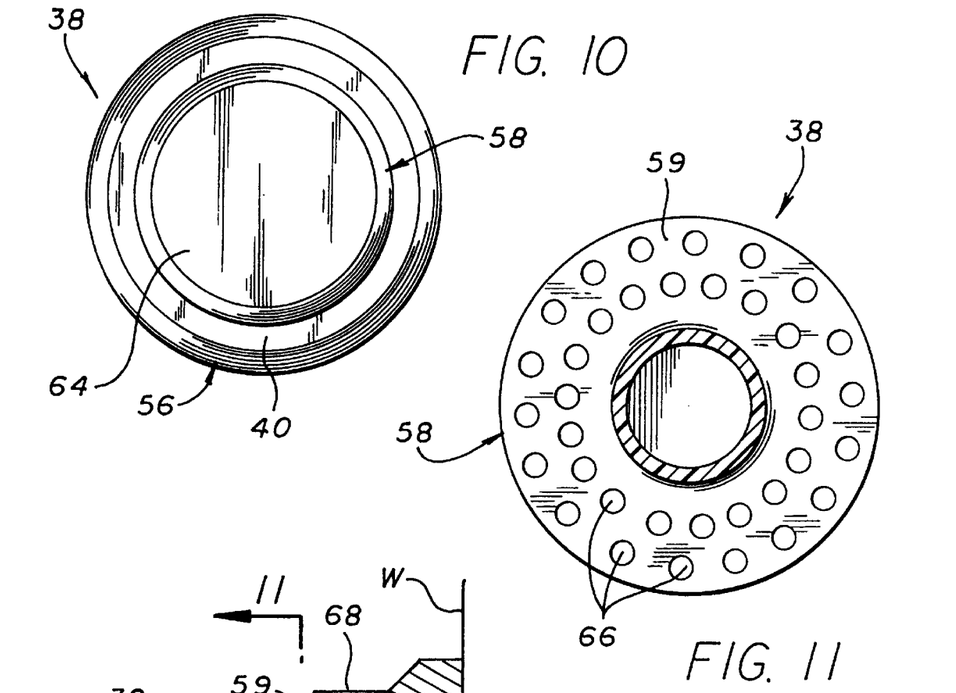
FIG. 10 is a schematic front view of the steam head of FIG. 9.
FIG. 11 is a schematic sectional view taken generally along line 11—11 of FIG. 9, showing of the rearward facing steam outlet of the steam head.

FIGS. 9 through 11 illustrate the improved steam head 38 utilized in the fixture 20. The illustrated steam head 38 includes a steam guard portion 56 which may be mounted against the front surface of a steam room supporting wall "W". The steam guard portion 56 provides the annular forwardly facing steam guard surface 40. The steam head 38 also includes a steam outlet portion 58 that provides the rearwardly facing steam outlet 39. (See FIG. 11.) Both the illustrated steam guard portion 56 and the steam head portion 58 are generally circular or disk shaped. Alternative shapes such as oblong or multisided could also be utilized.

A central hollow tubular intermediate conduit or hub portion 60 with a passageway 61 extends forwardly from the steam guard portion 56 to the steam head portion 58. As shown best in FIG. 9, the steam pipe or line 36 leading from the steam tank 34 extends through a central opening in the steam guard portion 56 and communicates with the passageway 61 through the conduit portion 60.

Steam from the line 36 flows through the passageway way 61 into a hollow interior or manifold 62 of the steam outlet portion 58. The forward face 64 of the steam outlet portion 58 is solid, however, the annular inward or rearwardly facing steam outlet 39 has a series of small circular steam outlets or openings 66 as shown in FIG. 11. The steam outlet 39 faces the steam guard surface 40. Thus, the steam is essentially reversed in the direction of its flow so that it flows back against the annular steam guard surface 40. This protects the supporting wall "W." An acrylic or fiber glass wall would be directly damaged by the steam flow, and the grout of a tile wall would be stained and/or cracked. After it is deflected by the steam guard surface 40, the steam flows outwardly and forwardly around the edges of the steam outlet portion 58 into the steam room.

The illustrated steam head 38 is formed as a single integral porcelain part for convenience of manufacture and assembly. As noted above, use of such material, which does not become overly hot when subjected to the high temperature of the live steam, limits potential harm to the users should they accidentally touch the steam head. The emerging steam is very hot, e.g., 211°–212° Fahrenheit. Such steam would heat metal, which is a heat sink, to around 200° Fahrenheit. The porcelain will only be heated to about 150° Fahrenheit.

The steam guard portion 56 may be suitably sealed to the supporting wall "W" as by a high temperature silicone sealing material to limit steam escaping from the steam room. The illustrated steam head 38 may include a fragrance reservoir 68 formed adjacent the top edge of the steam guard portion 56 for holding a quantity of fragrance which may be vaporized by the heating of the live steam.

Various modifications and changes may be made to the illustrated structure without departing from the spirit and scope of the invention as set forth in the following claims.

What is claimed is:

1. A wall-mounted steam fixture comprising:
   a) a frame for being mounted on a first side supporting wall of a closed area which has a floor, a ceiling and a plurality of side walls and into which steam may be introduced to provide a steam room area, the frame having an upright wall section that provides a front face which is generally aligned with said first side wall when the frame is mounted and which has a front face that is directed into and accessible from within said steam room area, b) a mirror mounted on said upright wall section of the frame, the mirror having a front surface directed into and exposed to the steam room area and a rear surface facing the opposite direction, c) a steam generating unit supported on the frame, and d) a steam line connected to the steam generating unit for directing steam from the mounted steam generating unit into the steam room area, the steam generating unit including a closed boiler that is disposed adjacent to the rear surface of the mirror so as to radiate heat to said rear surface and thereby limit fogging of the front surface of the mirror by the steam in the steam room area when the fixture is mounted.

2. The steam generating fixture of claim 1 wherein said rear surface of the mirror is spaced from the boiler so that there is a small air gap between the mirror and the boiler.

3. The steam generating fixture of claim 2 wherein said air gap is about one-eighth of an inch to about one-sixteenth of an inch.

4. The steam generating fixture of claim 1 further including a seal for being disposed between said upright frame wall section and said first side wall when said wall section is mounted on said side wall, to thereby prevent steam from leaving the steam room area or accessing the rear surface of the mirror.

5. The steam generating fixture of claim 1 in combination with an upright wall of the steam room area, said fixture being mounted on said upright wall so that the mirror is at about the height of the face of a user standing in the steam room area.

6. The steam generating fixture of claim 1 wherein said steam delivery line is connected at one end to said steam generating unit, said fixture further including a steam head connected at the other end of said steam delivery line, said steam head being mountable on a side wall of the steam room area.

7. The steam generating fixture of claim 1 wherein said steam line is relatively short and said steam head is mountable in relative close proximity to said fixture frame.

8. The steam generating fixture of claim 6 wherein said steam head when mounted extends outwardly into the steam room area and the steam is discharged back toward the supporting wall of the steam room area, said steam head including a steam guard surface on the supporting wall in the path of such discharging steam to thereby protect adjacent areas of the supporting wall.

9. The steam generating fixture of claim 1 further including a control system for achieving and maintaining a predetermined selected temperature in the steam room area by determining and essentially maintaining an appropriate effective level of power to the steam generating unit, said control system maintaining said effective level of power at least high enough at all times to provide generation of steam by the steam generating unit which appears to be generally continuous and uninterrupted to the user.

10. A thin compact wall-mountable essentially self-contained steam generating fixture comprising:

a) a frame mountable in a first side support wall of an enclosed steam room having a floor, a ceiling and a plurality of side walls, said frame having an upright porcelain face section for being generally aligned with said first side wall when said fixture is mounted, said frame having a front-to-rear depth of no more than about four inches, so as to fit generally within a standard wall, and a width of no more than about fourteen inches to fit in the space between a pair of standard spaced vertical wall studs, and b) a closed boiler tank unit supported generally within by said frame, said unit including electrical heating coils, c) a steam delivery line connected to the boiler tank unit for transporting steam from the boiler tank to the interior of the steam room, d) an electrical regulating system connected to the heating coils for regulating-the operation of the heating coils and thereby the temperature in the steam room area, e) manually operable controls connected to the regulating system for selecting the desired temperature for the steam room area.

11. The steam generating fixture of claim 10 wherein said steam delivery line is connected at one end to said boiler tank unit, said fixture further including a steam head connected at the other end of said steam delivery line, said steam head being mountable on a side wall of the steam room area.

12. The steam generating fixture of claim 11 wherein said steam head, when mounted, extends outwardly into the steam room area and steam is discharged back toward the supporting wall of the steam room area.

13. The steam generating fixture of claim 12 wherein said steam head further includes a steam guard surface mountable on the supporting side wall in the path of such discharging steam.

14. The steam generating fixture of claim 10 wherein said controls are mounted on said face section.

15. The steam generating fixture of claim 10 further including a control system for achieving and maintaining a predetermined user selected temperature in the steam room area by determining and essentially maintaining an effective level of power to the boiler tank unit to maintain said selected temperature, said control system maintaining said effective level of power at least high enough at all times to provide steam generation that appears generally continuous to the user.

16. The steam generating fixture of claim 15 wherein said control system utilizes historical data of the temperature in the steam room area to determine said effective power level sufficient for maintaining the user selected temperature.

17. The steam generating fixture of claim 16 wherein said control system utilizes that rate of change of the temperature in the steam room area to determine said effective power level sufficient for maintaining the user selected temperature.

18. The steam generating fixture of claim 10 further including a mirror mounted on the upright face section of the fixture and having a rear surface exposed to and spaced by a short air gap from the boiler tank unit so that heat radiated from the boiler tank unit heats the mirror and restricts fogging over of the mirror by the steam in the steam room area.

19. An improved steam head comprising:

a) a support portion for being mounted to a support wall, b) an elongated intermediate portion having opposed rear and forward ends, the rear end being fixed to said support portion, the intermediate portion extending forwardly from the support portion, and c) an outer steam dispensing portion fixed to said forward end of said intermediate portion and extending at least in part radially outwardly beyond said intermediate portion, said steam dispensing portion having a rearwardly facing dispensing surface disposed radially outwardly of said intermediate portion, said intermediate portion having an internal passageway there along, said steam dispensing portion having an internal cavity in fluid communication with said passageway, said support portion have an opening for communicating both with a supply of steam and with said intermediate portion passageway for introduction of steam into the steam head, said rearwardly facing dispensing surface having a plurality of spaced-apart steam dispensing holes.

20. The steam head of claim 19 wherein said rearwardly facing dispensing surface is annular and extends around said intermediate portion.

21. The steam head of claim 20 wherein annular dispensing surface is circular.

22. The steam head of claim 19 wherein said steam head is made of porcelain.

23. The steam head of claim 19 wherein said steam head is a single integral part.

24. The steam head of claim 19 further including a forwardly facing steam guard surface on said support portion, said steam guard surface facing said dispensing surface and being generally aligned therewith so as to protect the portion of the support wall rearwardly of said steam head support portion.

25. The steam of claim 24 wherein said steam guard surface is generally coextensive with said dispensing surface.

\* \* \* \* \*